(12) United States Patent
Yum et al.

(10) Patent No.: US 9,257,732 B2
(45) Date of Patent: Feb. 9, 2016

(54) BATTERY CELL ASSEMBLY

(71) Applicant: LG Chem, Ltd., Seoul (KR)

(72) Inventors: Juil Yum, Ann Arbor, MI (US); Satish Ketkar, Troy, MI (US); Heekook Yang, Troy, MI (US); Steven Lent, Canton, MI (US)

(73) Assignee: LG Chem, Ltd., Seoul (KR)

( * ) Notice: Subject to any disclaimer, the term of this patent is extended or adjusted under 35 U.S.C. 154(b) by 273 days.

(21) Appl. No.: 14/059,547

(22) Filed: Oct. 22, 2013

(65) Prior Publication Data

US 2015/0111075 A1    Apr. 23, 2015

(51) Int. Cl.
*H01M 10/656* (2014.01)
*H01M 10/6551* (2014.01)
*H01M 10/613* (2014.01)
*H01M 2/10* (2006.01)
*H01M 10/6569* (2014.01)
H01M 10/0525 (2010.01)

(52) U.S. Cl.
CPC .......... *H01M 10/613* (2015.04); *H01M 2/1077* (2013.01); *H01M 10/6551* (2015.04); *H01M 10/6569* (2015.04); *H01M 10/0525* (2013.01)

(58) Field of Classification Search
CPC .......... H01M 10/613; H01M 10/6569; H01M 10/6551; H01M 2/1077
USPC .......................................................... 429/83
See application file for complete search history.

(56) References Cited

U.S. PATENT DOCUMENTS

| 2,273,244 | A | 2/1942 | Cornelius |
| 2,391,859 | A | 1/1946 | Earl |
| 3,503,558 | A | 3/1970 | Galiulo et al. |
| 3,522,100 | A | 7/1970 | Lindstrom |
| 3,550,681 | A | 12/1970 | Stier et al. |
| 3,964,930 | A | 6/1976 | Reiser |

(Continued)

FOREIGN PATENT DOCUMENTS

| EP | 1577966 A | 9/2005 |
| EP | 1852925 A | 11/2007 |

(Continued)

OTHER PUBLICATIONS

"Gasket". Merriam-Webster. Merriam-Webster. Web. May 30, 2012. <http://www.merriam-webster.com/dictionary/gasket>.

(Continued)

*Primary Examiner* — Karie O'Neill Apicella
(74) *Attorney, Agent, or Firm* — Buckert Patent & Trademark Law Firm, PC; John F. Buckert

(57) ABSTRACT

A battery cell assembly having a first battery cell and a cooling fin is provided. The first battery cell has a first housing and first and second electrical terminals. The cooling fin is disposed against the first housing. The cooling fin has a substantially rectangular-shaped plate that extends along a longitudinal axis. The substantially rectangular-shaped plate has a plate portion with a first side and a second side. The first side has a first plurality of recessed regions and a first plurality of flat regions. Each recessed region of the first plurality of recessed regions is disposed between two flat regions of the first plurality of flat regions along the longitudinal axis. The first housing of the first battery cell is disposed against the first side such that the first housing contacts the first plurality of flat regions.

18 Claims, 9 Drawing Sheets

(56) References Cited

U.S. PATENT DOCUMENTS

| | | | |
|---|---|---|---|
| 4,009,752 A | 3/1977 | Wilson | |
| 4,063,590 A | 12/1977 | Mcconnell | |
| 4,298,904 A | 11/1981 | Koenig | |
| 4,305,456 A | 12/1981 | Mueller et al. | |
| 4,322,776 A | 3/1982 | Job et al. | |
| 4,444,994 A | 4/1984 | Baker et al. | |
| 4,518,663 A | 5/1985 | Kodali et al. | |
| 4,646,202 A | 2/1987 | Hook et al. | |
| 4,701,829 A | 10/1987 | Bricaud et al. | |
| 4,777,561 A | 10/1988 | Murphy et al. | |
| 4,849,858 A | 7/1989 | Grapes et al. | |
| 4,982,785 A | 1/1991 | Tomlinson | |
| 4,995,240 A | 2/1991 | Barthel et al. | |
| 5,057,968 A | 10/1991 | Morrison | |
| 5,071,652 A | 12/1991 | Jones et al. | |
| 5,214,564 A | 5/1993 | Metzler et al. | |
| 5,270,131 A | 12/1993 | Diethelm et al. | |
| 5,322,745 A | 6/1994 | Yanagihara et al. | |
| 5,329,988 A | 7/1994 | Juger | |
| 5,346,786 A | 9/1994 | Hodgetts | |
| 5,356,735 A | 10/1994 | Meadows et al. | |
| 5,510,203 A | 4/1996 | Hamada et al. | |
| 5,520,976 A | 5/1996 | Giannetti et al. | |
| 5,663,007 A | 9/1997 | Ikoma et al. | |
| 5,736,836 A | 4/1998 | Hasegawa et al. | |
| 5,756,227 A | 5/1998 | Suzuki et al. | |
| 5,937,664 A | 8/1999 | Matsuno et al. | |
| 6,087,036 A | 7/2000 | Rouillard et al. | |
| 6,111,387 A | 8/2000 | Kouzu et al. | |
| 6,176,095 B1 | 1/2001 | Porter | |
| 6,344,728 B1 | 2/2002 | Kouzu et al. | |
| 6,362,598 B2 | 3/2002 | Laig-Horstebrock et al. | |
| 6,399,238 B1 | 6/2002 | Oweis et al. | |
| 6,422,027 B1 | 7/2002 | Coates, Jr. et al. | |
| 6,448,741 B1 | 9/2002 | Inui et al. | |
| 6,462,949 B1 | 10/2002 | Parish, IV et al. | |
| 6,512,347 B1 | 1/2003 | Hellmann et al. | |
| 6,569,556 B2 | 5/2003 | Zhou et al. | |
| 6,662,891 B2 | 12/2003 | Misu et al. | |
| 6,689,510 B1 | 2/2004 | Gow et al. | |
| 6,696,197 B2 | 2/2004 | Inagaki et al. | |
| 6,724,172 B2 | 4/2004 | Koo | |
| 6,750,630 B2 | 6/2004 | Inoue et al. | |
| 6,775,998 B2 | 8/2004 | Yuasa et al. | |
| 6,780,538 B2 | 8/2004 | Hamada et al. | |
| 6,821,671 B2 | 11/2004 | Hinton et al. | |
| 6,826,948 B1 | 12/2004 | Bhatti et al. | |
| 6,878,485 B2 | 4/2005 | Ovshinsky et al. | |
| 6,982,131 B1 | 1/2006 | Hamada et al. | |
| 7,070,874 B2 | 7/2006 | Blanchet et al. | |
| 7,143,724 B2 | 12/2006 | Hashizumi et al. | |
| 7,150,935 B2 | 12/2006 | Hamada et al. | |
| 7,250,741 B2 | 7/2007 | Koo et al. | |
| 7,264,902 B2 | 9/2007 | Horie et al. | |
| 7,278,389 B2 | 10/2007 | Kirakosyan | |
| 7,467,525 B1 | 12/2008 | Ohta et al. | |
| 7,531,270 B2 | 5/2009 | Buck et al. | |
| 7,795,845 B2 | 9/2010 | Cho | |
| 7,797,958 B2 | 9/2010 | Alston et al. | |
| 7,816,029 B2 | 10/2010 | Takamatsu et al. | |
| 7,846,573 B2 | 12/2010 | Kelly | |
| 7,879,480 B2 | 2/2011 | Yoon et al. | |
| 7,883,793 B2 | 2/2011 | Niedzwiecki et al. | |
| 7,976,978 B2 | 7/2011 | Shin et al. | |
| 7,981,538 B2 | 7/2011 | Kim et al. | |
| 7,997,367 B2 | 8/2011 | Nakamura | |
| 8,007,915 B2 | 8/2011 | Kurachi | |
| 8,030,886 B2 | 10/2011 | Mahalingam et al. | |
| 8,067,111 B2 | 11/2011 | Koetting et al. | |
| 8,209,991 B2 | 7/2012 | Kondou et al. | |
| 2002/0182493 A1 | 12/2002 | Ovshinsky et al. | |
| 2003/0080714 A1 | 5/2003 | Inoue et al. | |
| 2003/0211384 A1 | 11/2003 | Hamada et al. | |
| 2004/0069474 A1 | 4/2004 | Wu et al. | |
| 2005/0026014 A1 | 2/2005 | Fogaing et al. | |
| 2005/0089750 A1 | 4/2005 | Ng et al. | |
| 2005/0103486 A1 | 5/2005 | Demuth et al. | |
| 2005/0110460 A1 | 5/2005 | Arai et al. | |
| 2005/0134038 A1 | 6/2005 | Walsh | |
| 2006/0234119 A1 | 10/2006 | Kruger et al. | |
| 2006/0286450 A1 | 12/2006 | Yoon et al. | |
| 2007/0062681 A1 | 3/2007 | Beech | |
| 2007/0087266 A1 | 4/2007 | Bourke et al. | |
| 2008/0003491 A1 | 1/2008 | Yahnker et al. | |
| 2008/0041079 A1 | 2/2008 | Nishijima et al. | |
| 2008/0110189 A1 | 5/2008 | Alston et al. | |
| 2008/0182151 A1 | 7/2008 | Mizusaki et al. | |
| 2008/0248338 A1 | 10/2008 | Yano et al. | |
| 2008/0314071 A1 | 12/2008 | Ohta et al. | |
| 2009/0074478 A1 | 3/2009 | Kurachi | |
| 2009/0087727 A1 | 4/2009 | Harada et al. | |
| 2009/0104512 A1 | 4/2009 | Fassnacht et al. | |
| 2009/0155680 A1 | 6/2009 | Maguire et al. | |
| 2009/0186265 A1 | 7/2009 | Koetting et al. | |
| 2009/0258288 A1 | 10/2009 | Weber et al. | |
| 2009/0258289 A1 | 10/2009 | Weber et al. | |
| 2009/0280395 A1 | 11/2009 | Nemesh et al. | |
| 2009/0325051 A1 | 12/2009 | Niedzwiecki et al. | |
| 2009/0325052 A1 | 12/2009 | Koetting et al. | |
| 2009/0325054 A1 | 12/2009 | Payne et al. | |
| 2009/0325055 A1 | 12/2009 | Koetting et al. | |
| 2010/0112419 A1 | 5/2010 | Jang et al. | |
| 2010/0203376 A1 | 8/2010 | Choi et al. | |
| 2010/0209760 A1 | 8/2010 | Yoshihara et al. | |
| 2010/0262791 A1 | 10/2010 | Gilton | |
| 2010/0275619 A1 | 11/2010 | Koetting et al. | |
| 2010/0276132 A1 | 11/2010 | Payne | |
| 2010/0279152 A1 | 11/2010 | Payne | |
| 2010/0279154 A1 | 11/2010 | Koetting et al. | |
| 2011/0027640 A1 | 2/2011 | Gadawski et al. | |
| 2011/0041525 A1 | 2/2011 | Kim et al. | |
| 2011/0052959 A1 | 3/2011 | Koetting et al. | |
| 2011/0293982 A1* | 12/2011 | Martz | H01M 10/5004 429/120 |
| 2012/0040223 A1* | 2/2012 | Odumodu | H01M 2/1077 429/120 |
| 2012/0082880 A1 | 4/2012 | Koetting et al. | |
| 2013/0189557 A1* | 7/2013 | Haussmann | F28D 7/06 429/120 |

FOREIGN PATENT DOCUMENTS

| | | |
|---|---|---|
| JP | 08111244 | 4/1996 |
| JP | 09129213 | 5/1997 |
| JP | 09219213 | 8/1997 |
| JP | 2001105843 A | 4/2001 |
| JP | 2002038033 A | 2/2002 |
| JP | 2002319383 A | 10/2002 |
| JP | 2003188323 A | 7/2003 |
| JP | 2003282112 A | 10/2003 |
| JP | 2004333115 A | 11/2004 |
| JP | 2005126315 A | 5/2005 |
| JP | 2005147443 A | 6/2005 |
| JP | 2005349955 A | 12/2005 |
| JP | 2006139928 A | 6/2006 |
| JP | 2007305425 A | 11/2007 |
| JP | 2008054379 A | 3/2008 |
| JP | 2008062875 A | 3/2008 |
| JP | 2008080995 A | 4/2008 |
| JP | 2008159440 A | 7/2008 |
| JP | 2009009889 A | 1/2009 |
| JP | 2009054297 A | 3/2009 |
| KR | 20050092605 A | 9/2005 |
| KR | 100637472 B1 | 10/2006 |
| KR | 100765659 B1 | 10/2007 |
| KR | 20080047641 A | 5/2008 |
| KR | 20090082212 A | 7/2009 |
| KR | 100921346 B1 | 10/2009 |
| WO | 2006101343 A | 9/2006 |
| WO | 2007007503 A | 1/2007 |
| WO | 2007115743 A2 | 10/2007 |

(56) References Cited

FOREIGN PATENT DOCUMENTS

| WO | 2008111162 A | 9/2008 |
|---|---|---|
| WO | 2009073225 A | 6/2009 |

OTHER PUBLICATIONS

International Search Report; International Application No. PCT/KR2009/000258; International Filing Date: Jan. 16, 2009; Date of Mailing: Aug. 28, 2009; 2 pages.
International Search Report; International Application No. PCT/KR2009/003428, International Filing Date: Jun. 25, 2009; Date of Mailing: Jan. 22, 2010; 2 pages.
International Search Report; International Application No. PCT/KR2009/003429; International Filing Date: Jun. 25, 2009; Date of Mailing: Jan. 12, 2010; 3 pages.
International Search Report; International Application No. PCT/KR2009/003430; International Filing Date: Jun. 25, 2009; Date of Mailing: Feb. 3, 2010, 2 pages.
International Search Report; International Application No. PCT/KR2009/003434; International Filing Date: Jun. 25, 2009; Date of Mailing: Jan. 18, 2010; 2 pages.
International Search Report; International Application No. PCT/KR2009/003436; International Filing Date: Jun. 25, 2009; Date of Mailing: Jan. 22, 2010; 2 pages.
International Search Report; International Application No. PCT/KR2009/006121; International Filing Date: Oct. 22, 2009; Date of Mailing: May 3, 2010; 2 pages.
International Search Report; International Application No. PCT/KR2010/002334; International Filing Date: Apr. 15, 2010; Date of Mailing: Nov. 29, 2010; 2 pages.
International Search Report; International Application No. PCT/KR2010/002336; International Filing Date: Apr. 15, 2010; Date of Mailing: Jan. 31, 2011; 2 pages.
International Search Report; International Application No. PCT/KR2010/002337; International Filing Date: Apr. 15, 2010; Date of Mailing: May 3, 2010; 2 pages.
International Search Report; International Application No. PCT/KR2010/002340; International Filing Date: Apr. 15, 2010; Date of Mailing: Jan. 31, 2011; 2 pages.
International Search Report; International Application No. PCT/KR2010/004944; International Filing Date: Jul. 28, 2010; Date of Mailing: Apr. 29, 2011; 2 pages.
International Search Report; International Application No. PCT/KR2010/005639; International Filing Date: Aug. 24, 2010; Date of Mailing: Jun. 3, 2011; 2 pages.
Thomas J. Gadawski et al., pending U.S. Appl. No. 13/433,649 entitled "Battery System and Method for Cooling the Battery System," filed with the U.S. Patent and Trademark Office on Mar. 29, 2012.
U.S. Appl. No. 13/475,963, filed May 19, 2012 entitled Battery Cell Assembly and Method for Manufacturing a Cooling Fin for the Battery Cell Assembly.
U.S. Appl. No. 13/586,960, filed Aug. 16, 2012 entitled Battery Module.
U.S. Appl. No. 13/587,030, filed Aug. 16, 2012 entitled Battery Module and Method for Assembling the Battery Module.
U.S. Appl. No. 13/766,162, filed Feb. 13, 2013 entitled Battery Cell Assembly and Method for Manufacturing the Battery Cell Assembly.
U.S. Appl. No. 13/686,018, filed Nov. 27, 2012 entitled Battery System and Method for Cooling a Battery Cell Assembly.
U.S. Appl. No. 13/861,426, filed Apr. 12, 2013 entitled Battery Cell Assembly and Method for Manufacturing a Cooling Fin for the Battery Cell Assembly.
U.S. Appl. No. 13/936,556, filed Jul. 8, 2013 entitled Battery Assembly.

\* cited by examiner

BATTERY CELL ASSEMBLY

BACKGROUND

As battery cells within a battery cell assembly age, the battery cells can swell and produce an outward pressure on frame members holding the battery cells therein.

Accordingly, the inventors herein have recognized a need for an improved battery cell assembly that is designed to accommodate a swelling of battery cells that reduces an amount of force applied to frame members holding the battery cells therein.

SUMMARY

A battery cell assembly in accordance with an exemplary embodiment is provided. The battery cell assembly includes a first battery cell having a first housing and first and second electrical terminals extending from the first housing. The battery cell assembly further includes a cooling fin disposed against the first housing of the first battery cell. The cooling fin has a substantially rectangular-shaped plate that extends along a longitudinal axis. The substantially rectangular-shaped plate has a plate portion with a first side and a second side. The first side has a first plurality of recessed regions and a first plurality of flat regions. Each recessed region of the first plurality of recessed regions is disposed between two flat regions of the first plurality of flat regions along the longitudinal axis. The first housing of the first battery cell is disposed against the first side such that the first housing contacts the first plurality of flat regions.

DETAILED DESCRIPTION

Figure 1:
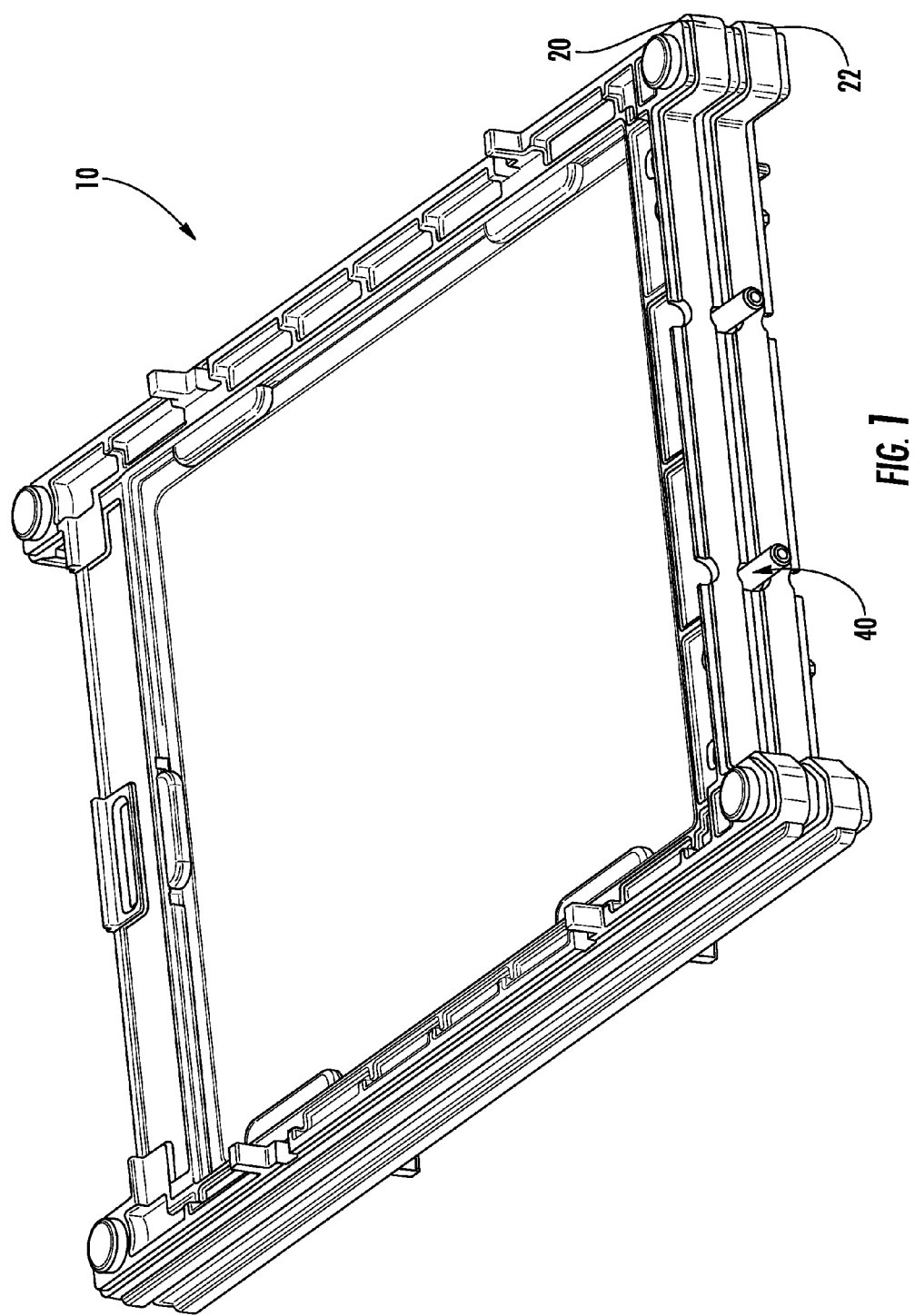
FIG. 1 is a schematic of a battery cell assembly in accordance with an exemplary embodiment.
Figure 2:
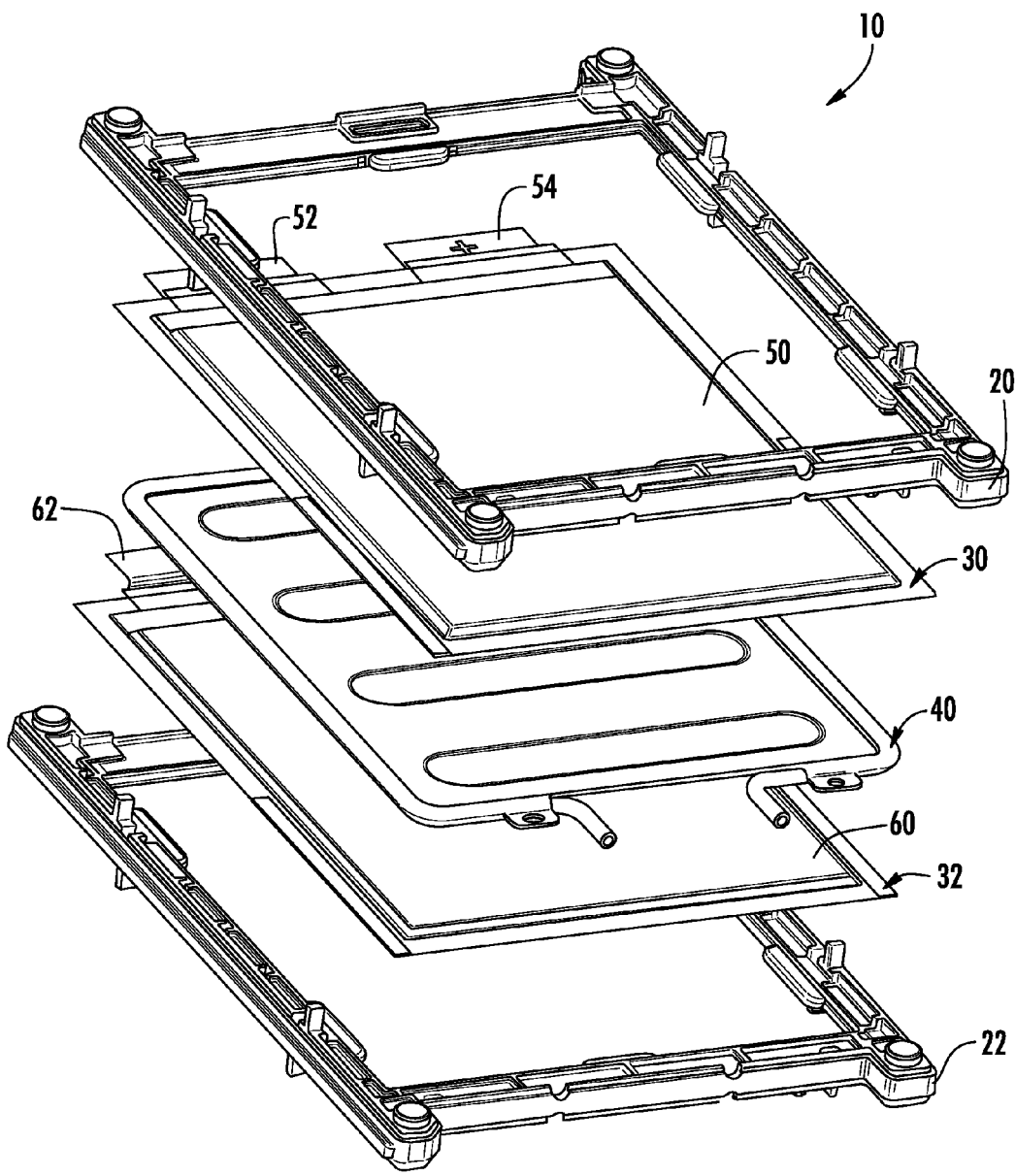
FIG. 2 is an exploded view of the battery cell assembly of FIG. 1.
Figure 3:
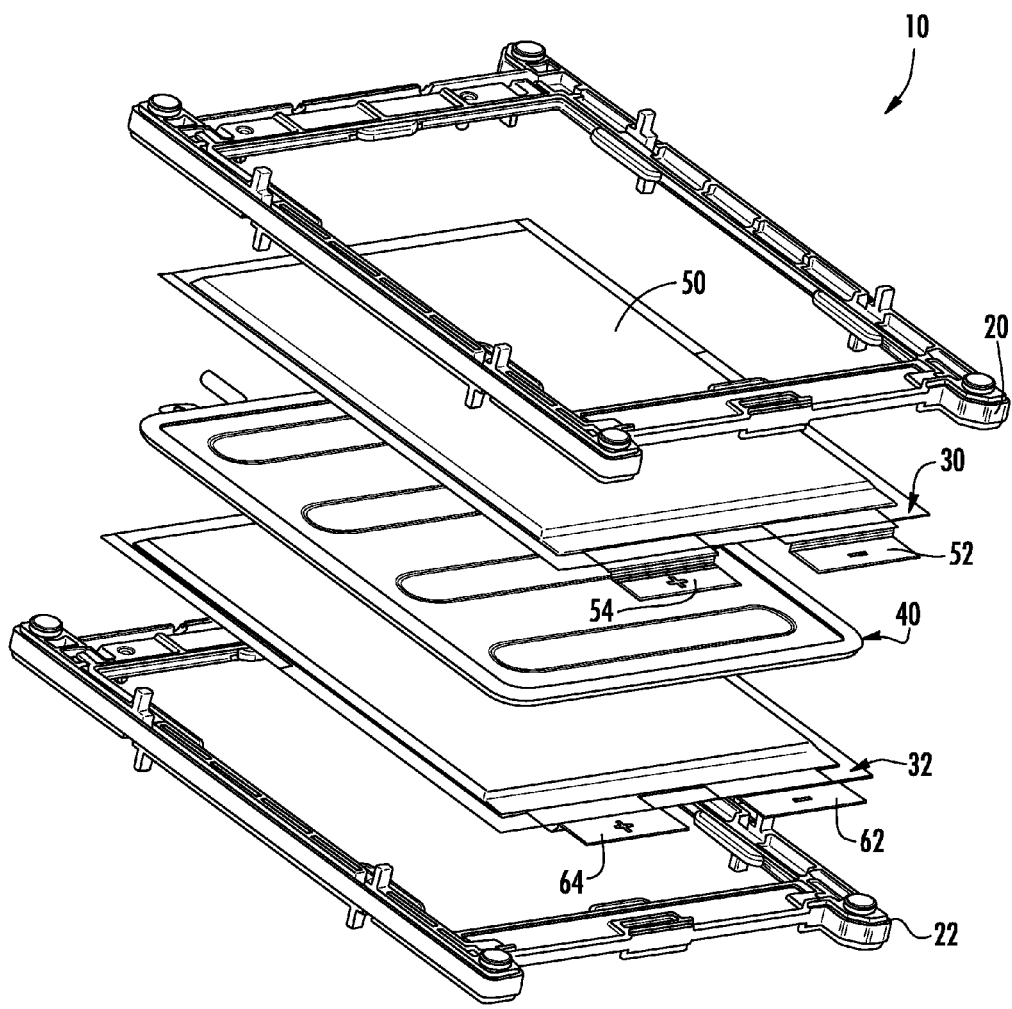
FIG. 3 is another exploded view of the battery cell assembly of FIG. 1.

Referring to FIGS. 1-3, a battery cell assembly 10 in accordance with an exemplary embodiment is provided. The battery cell assembly 10 includes rectangular ring-shaped frame members 20, 22, battery cells 30, 32, and a cooling fin 40. An advantage of the battery cell assembly 10 is that the assembly 10 utilizes the cooling fin 40 having recessed regions which can receive portions of the battery cells 30, 32 therein as the battery cells 30, 32 age and begin to swell outwardly, such that the recessed regions reduce an amount of force applied by the battery cells to the frame members 20, 22.

The rectangular ring-shaped frame members 20, 22 are configured to be coupled together to hold the battery cells 30, 32 and the cooling fin 40 therebetween. In one exemplary embodiment, the rectangular ring-shaped frame members 20, 22 are constructed of plastic. However, in alternative embodiments, the rectangular ring-shaped frame members 20, 22 could be constructed of other materials known to those skilled in the art. The rectangular ring-shaped frame members 20, 22 may be ultrasonically welded together.

Referring to FIGS. 2 and 3, the battery cells 30, 32 are each configured to generate an operational voltage. In one exemplary embodiment, each of the battery cells 30, 32 are pouch-type lithium-ion battery cells having a substantially rectangular peripheral profile. Of course, other types of battery cells known to those skilled in the art could be utilized. In an exemplary embodiment, the battery cells 30, 32 are electrically coupled in series to one another.

The battery cell 30 includes a rectangular-shaped housing 50 and electrical terminals 52, 54 extending from the housing 50. The battery cell 30 is disposed between the rectangular ring-shaped frame member 20 and the cooling fin 40.

The battery cell 32 includes a rectangular-shaped housing 60 and electrical terminals 62, 64 extending from the housing 60. The battery cell 32 is disposed between the rectangular ring-shaped frame member 22 and the cooling fin 40.

Referring to FIGS. 2 and 4-9, the cooling fin 40 is disposed against and between the housings 50, 60 of the battery cells 30, 32, respectively, and is configured to transfer heat energy from the battery cells 30, 32 to a refrigerant or a liquid flowing through the cooling fin 40 to cool the battery cells 30, 32. The cooling fin 40 includes a substantially rectangular-shaped plate 70 and a tube 72.

The substantially rectangular-shaped plate 70 extends along a longitudinal axis 74. The substantially rectangular-shaped plate 70 includes a plate portion 80 (shown in FIG. 6) and first, second, third, and fourth peripheral edge portions 82, 84, 86, 88 coupled to and around a periphery of the plate portion 80. In an exemplary embodiment, the substantially rectangular-shaped plate 70 is constructed of aluminum. Of course, in an alternative embodiment, the substantially rectangular-shaped plate 70 could be constructed of other materials such as steel, stainless steel, or copper for example.

The plate portion 80 is substantially rectangular-shaped and includes a first side 100 and a second side 102 disposed opposite to the first side 100. The first side 100 is sized to cover or encompass substantially all of a substantially rectangular-shaped side surface of the battery cell 30. The second side 102 is sized to cover or encompass substantially all of a substantially rectangular-shaped side surface of the battery cell 32.

Referring to FIGS. 2, 4, 6, 8 and 9, the first side 100 has a first plurality of recessed regions 110 and a first plurality of flat regions 112. Each recessed region of the first plurality of recessed regions 110 is disposed between two flat regions of the first plurality of flat regions 112 along the longitudinal axis 74. A depth D1 (shown in FIG. 9) of the each recessed region of the first plurality of recessed regions 110 is less than one-half of a thickness T of the plate portion 80. Each recessed region of the first plurality of recessed regions 110 extends substantially perpendicular to the longitudinal axis 74 and extends across at least two-thirds of a width W of the plate portion 80. The first plurality of recessed regions 110 are configured to receive portions of the housing 50 of the battery cell 30 as the housing 50 expands outwardly over time. The first plurality of recessed regions 110 includes recessed regions 130, 132, 134, 136 disposed apart from one another along the longitudinal axis 74 and extending substantially parallel to one another. Further, the first plurality of flat regions 112 includes flat regions 140, 142, 144, 146, 148 disposed apart from one another along the longitudinal axis 74. During assembly of the battery cell assembly 10, the housing 50 of the battery cell 30 is disposed against the first side 100 such that the housing 50 contacts the first plurality of flat regions 112 and does not contact the first plurality of recessed regions 110, before the housing 50 expands outwardly during the aging of the battery cell 30 over time durations such as months and years for example.

Referring to FIGS. 2, 5, 8 and 9, the second side 102 has a second plurality of recessed regions 120 and a second plurality of flat regions 122. Each recessed region of the second plurality of recessed regions 120 is disposed between two flat regions of the second plurality of flat regions 122 along the longitudinal axis 74. A depth D2 (shown in FIG. 9) of the each recessed region of the second plurality of recessed regions 120 is less than one-half of a thickness T of the plate portion 80. Each recessed region of the second plurality of recessed regions 120 extends substantially perpendicular to the longitudinal axis 74 and extends across at least two-thirds of a width of the plate portion 80. The second plurality of recessed regions 120 are configured to receive portions of the housing 60 of the battery cell 32 as the housing 60 expands outwardly over time. The second plurality of recessed regions 120 includes recessed regions 150, 152, 154, 156 disposed apart from one another along the longitudinal axis 74 and extending substantially parallel to one another. The second plurality of flat regions 122 includes flat regions 160, 162, 164, 166, 168 disposed apart from one another along the longitudinal axis 74. During assembly of the battery cell assembly 10, the housing 60 of the battery cell 32 is disposed against the second side 102 such that the housing 60 contacts the second plurality of flat regions 122 and does not contact the second plurality of recessed regions 120, before the housing 60 expands outwardly during the aging of the battery cell 32 over time durations such as months and years for example.

Figure 7:
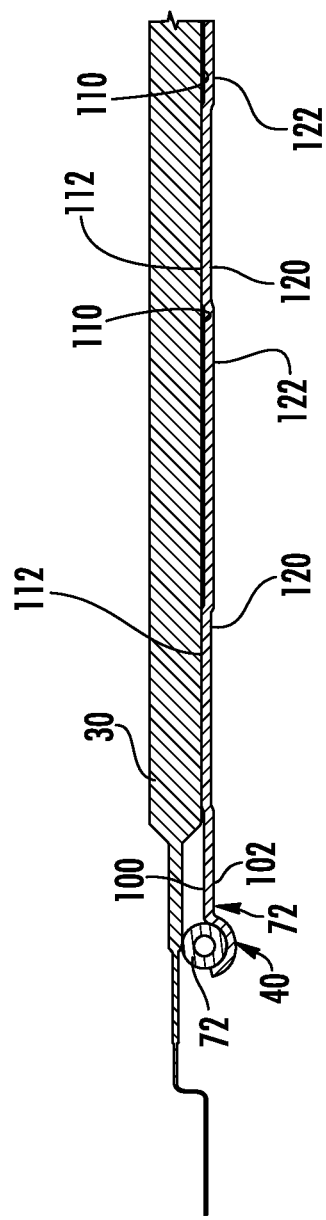
FIG. 7 is an enlarged cross-sectional schematic of a portion of the battery cell assembly of FIG. 1 illustrating a portion of a battery cell and a portion of the cooling fin of FIG. 4.
Figure 8:
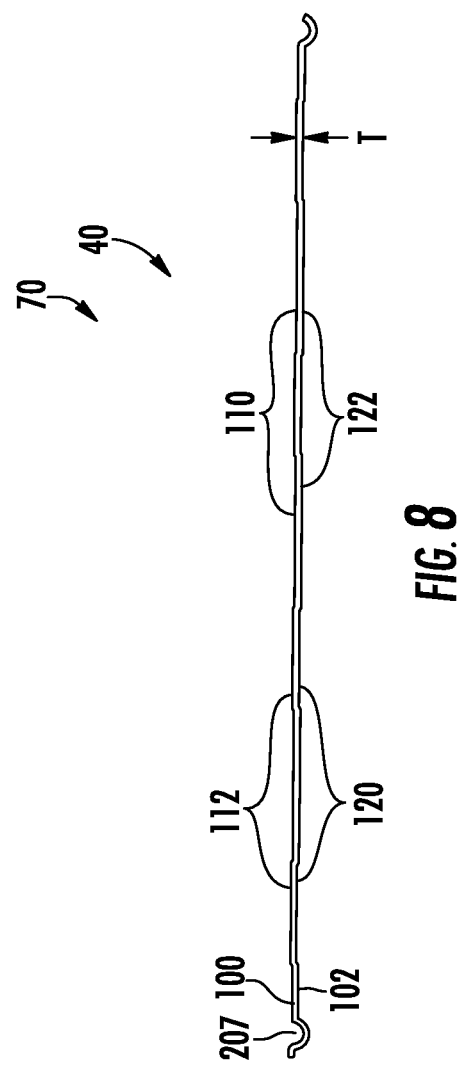
FIG. 8 is a schematic of a substantially rectangular-shaped plate utilized in the cooling fin of FIG. 4.
Figure 9:
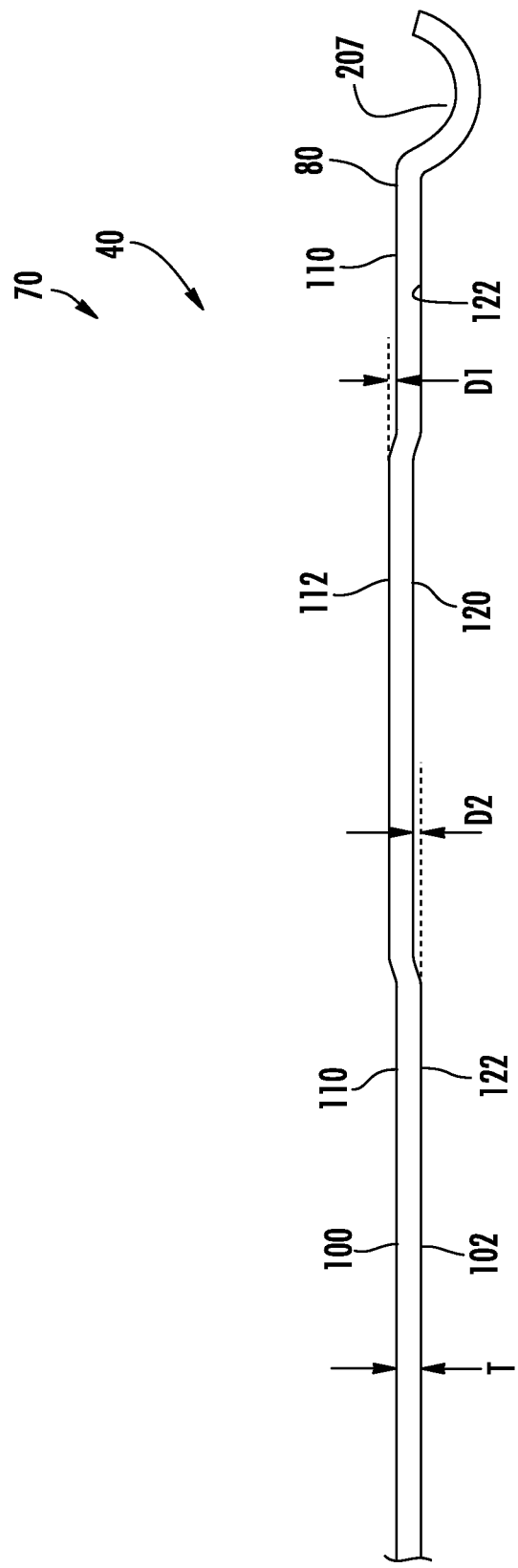
FIG. 9 is an enlarged schematic of a portion of the substantially rectangular-shaped plate of FIG. 8.

Referring to FIGS. 7-9, each recessed region of the first plurality of recessed regions 110 is disposed opposite to a respective flat region of the second plurality of flat regions 112. Further, each flat region of the first plurality of flat regions 112 is disposed opposite to a recessed region of the second plurality of recessed regions 120.

Figure 6:
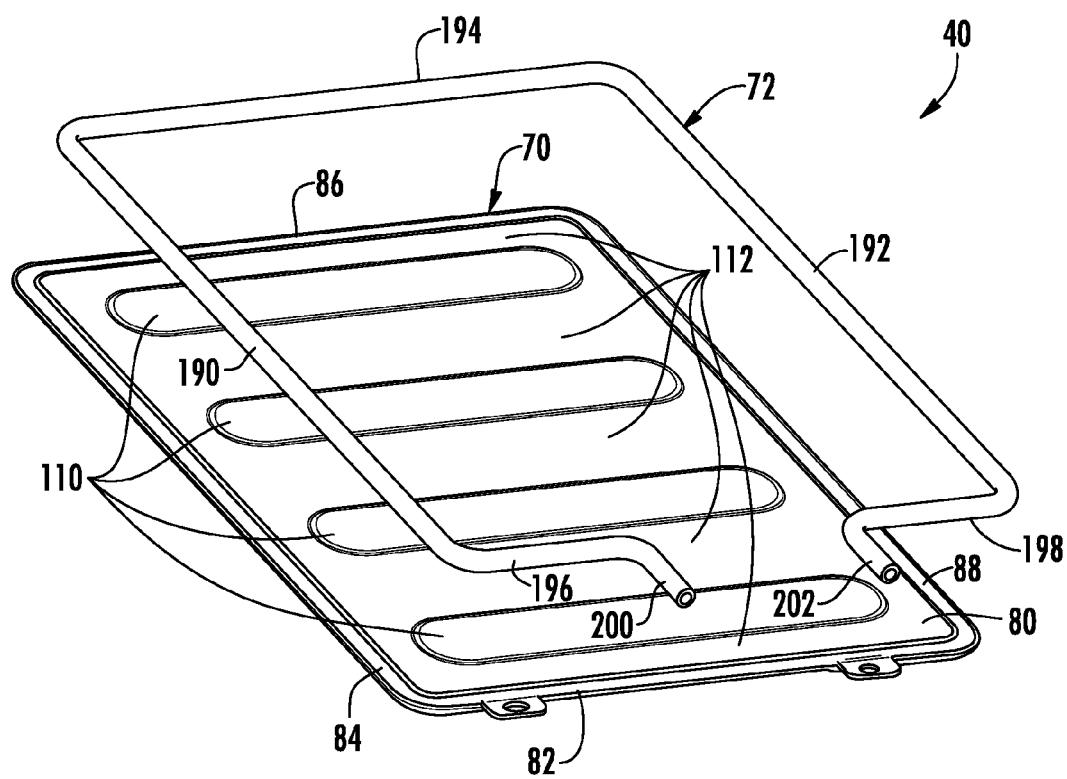
FIG. 6 is an exploded view of the cooling fin of FIG. 4.

Referring to FIG. 6, the first, second, third, and fourth peripheral edge portions 82, 84, 86, 88 are coupled to and extend from the plate portion 80. In an exemplary embodiment, the first, second, third, and fourth peripheral edge portions 82, 84, 86, 88 extend outwardly from first, second, third, and fourth edges, respectively, of the plate portion 80. The first peripheral edge portion 82 and the third peripheral edge portion 86 extend substantially parallel to one another. The second peripheral edge portion 84 and the fourth peripheral edge 88 extend substantially parallel to one another. The first, second, third, and fourth peripheral edge portions 82, 84, 86, 88 define an arcuate-shaped groove 207 (shown in FIGS. 8 and 9) configured to receive the tube 72 thereon.

Figure 4:
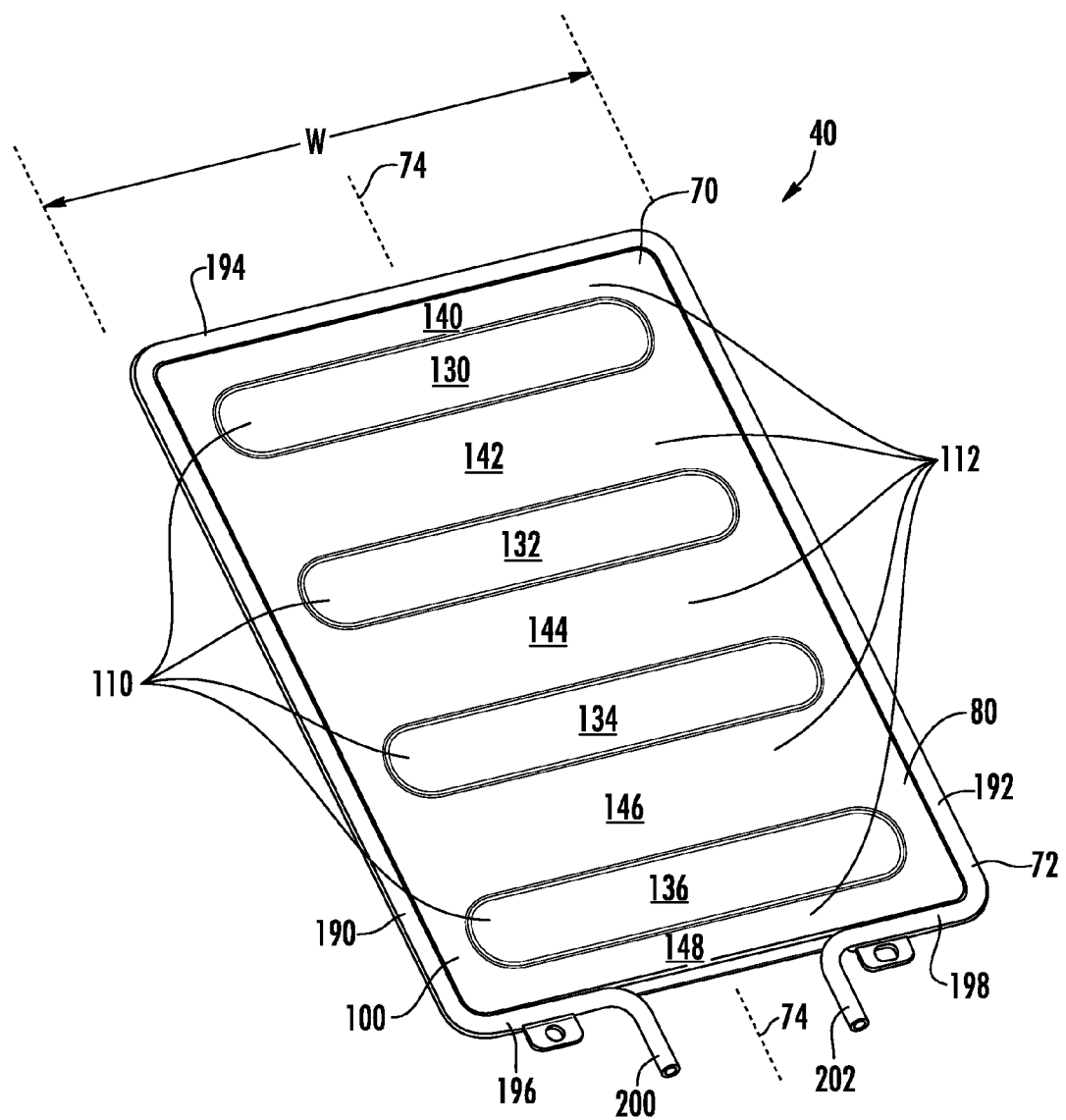
FIG. 4 is a schematic of a cooling fin utilized in the battery cell assembly of FIG. 1.
Figure 5:
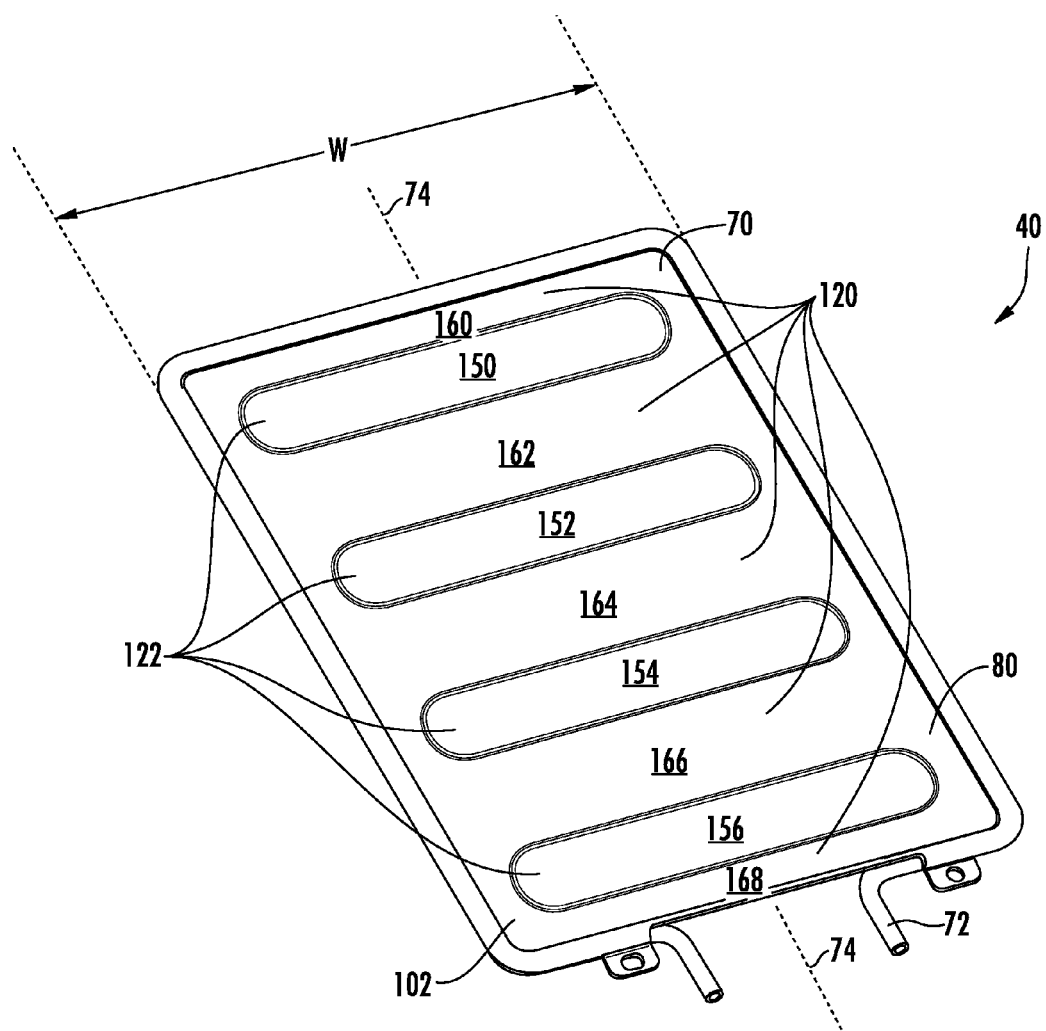
FIG. 5 is another schematic of a cooling fin utilized in the battery cell assembly of FIG. 1.

Referring to FIGS. 4 and 6, the tube 72 is coupled to the first, second, third, and fourth peripheral edge portions 82, 84, 86, 88, and the tube 72 defines an internal flow path therein. The tube 72 is configured to transfer at least a portion of the heat energy from the battery cells 30, 32 to a liquid or a refrigerant flowing through the tube 72.

The tube 72 includes a first tube portion 190, a second tube portion 192, a third tube portion 194, a fourth tube portion 196, a fifth tube portion 198, a sixth tube portion 200, and a seventh tube portion 202 that fluidly communicate with one another. The first and second tube portions 190, 192 are substantially parallel to one another. The third tube portion 194 is substantially perpendicular to the first and second tube portions 190, 192 and extends between the first and second tube portions 190, 192. The fourth and fifth tube portions 196, 198 extend from the first and second tube portions 190, 192, respectively, and are substantially perpendicular to the first and second tube portions 190, 192, respectively. The sixth and seventh tube portions 200, 202 extend from the fourth and fifth tube portions 196, 198, respectively, and are substantially perpendicular to the fourth and fifth tube portions 196, 198, respectively. As shown, the tube portions 190, 194, 192 are coupled to the second, third, fourth peripheral edge portions 84, 86, 88, respectively. Further, the tube portions 196, 198 are both coupled to the first peripheral edge portion 82. In an exemplary embodiment, the tube 72 is welded to the first, second, third, and fourth peripheral edge portions 82, 84, 86, 88. In an exemplary embodiment, the tube 72 is constructed of aluminum. However, the tube 72 could be constructed of other materials known to those skilled in the art.

Referring to FIGS. 2 and 4, during operation, a refrigerant or a liquid enters the sixth tube portion 200 from a source device (not shown) and flows through the fourth tube portion 196, the first tube portion 190, the third tube portion 194, the second tube portion 192, the fifth tube portion 198, and the seventh tube portion 202 and exits the seventh tube portion 202 to a receiving device. Heat energy generated by the battery cells 30, 32 are conducted through the substantially rectangular-shaped plate 70 to the tube 72. Further, the heat energy in the tube 72 is conducted into the refrigerant or the liquid flowing through the tube 72. Thus, the refrigerant or the liquid flowing through the tube 72 absorbs the heat energy from the battery cells 30, 32 to reduce a temperature of the battery cells 30, 32.

The battery cell assembly 10 provides a substantial advantage over other battery cell assemblies. In particular, the battery cell assembly 10 provides a technical effect of utilizing a cooling fin having recessed regions which is configured to receive portions of the battery cells as the battery cells begin to swell outwardly over time (e.g., months or years) that reduces an amount of force applied to frame members holding the battery cells therein.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery cell assembly, comprising:
a first battery cell having a first housing and first and second electrical terminals extending from the first housing; and
a cooling fin disposed against and contacting the first housing of the first battery cell, the cooling fin having a substantially rectangular-shaped plate that extends along a longitudinal axis, the substantially rectangular-shaped plate having a plate portion with a first side and a second side, the first side having first, second, and third recessed regions and first, second, third, and fourth flat regions, the first recessed region being disposed between and contacting the first and second flat regions along the longitudinal axis, the second recessed region being disposed between and contacting the second and third flat regions along the longitudinal axis, the third recessed region being disposed between and contacting the third and fourth flat reions along the longitudinal axis; the first, second, and third recessed regions being disposed away and apart from each other; each of the first, second, and third recessed regions extending substantially perpendicular to the longitudinal axis and extending across at least two-thirds of a width of the plate portion, a depth of the each of the first, second, and third recessed regions is less than one-half of a thickness of the plate portion; and the first housing of the first battery cell being disposed against the first side of the plate portion of the substantially rectangular-shaped plate such that the first housing contacts the first, second, third, and fourth flat regions.

2. The battery cell assembly of claim 1, wherein the first, second, and third recessed regions are configured to receive portions of the first housing of the first battery cell therein as the first housing expands outwardly over time.

3. The battery cell assembly of claim 1, further comprising:
a second battery cell having a second housing and first and second electrical terminals extending from the second housing; and
the second side of the plate portion having a fourth, fifth, and sixth recessed regions and fifth, sixth, seventh, and eighth flat regions, the fourth recessed region being disposed between the fifth and sixth flat regions along the longitudinal axis, the fifth recessed region being disposed between the sixth and seventh flat regions along the longitudinal axis, the sixth recessed region being disposed between the seventh and eighth flat regions along the longitudinal axis, the second housing of the second battery cell being disposed against the second side such that the second housing contacts the fifth, sixth, seventh, and eighth flat regions.

4. The battery cell assembly of claim 3, wherein the fourth, fifth, and sixth recessed regions are configured to receive portions of the second housing of the second battery cell therein as the second housing expands outwardly over time.

5. The battery cell assembly of claim 3, wherein a depth of the fourth, fifth, and sixth recessed regions is less than one-half of a thickness of the plate portion.

6. The battery cell assembly of claim 3, wherein each of the fourth, fifth, and sixth recessed regions extend substantially perpendicular to the longitudinal axis and extends across at least two-thirds of the width of the plate portion.

7. The battery cell assembly of claim 3, wherein the fourth, fifth, and sixth recessed regions are disposed opposite to the first, second, and third recessed regions, respectively.

8. The battery cell assembly of claim 3, further comprising first and second rectangular ring-shaped frame members, the cooling fin and the first and second battery cells being disposed between the first and second rectangular ring-shaped frame members.

9. The battery cell assembly of claim 1, wherein the substantially rectangular-shaped plate further includes first, second, third, and fourth peripheral edge portions coupled to and extending from the plate portion, the cooling fin further having a tube coupled to the first, second, third, and fourth peripheral edge portions, the tube defining an internal flow path therein.

10. The battery cell assembly of claim 9, wherein the first, second, third, and fourth peripheral edge portions of the substantially rectangular-shaped plate define an arcuate-shaped groove configured to receive the tube thereon.

11. The battery cell assembly of claim 9, wherein the tube includes an inlet port, an outlet port, and an internal flow path disposed between the inlet port and the outlet port, the cooling fin configured to receive a two-phase refrigerant in the inlet port, the cooling fin further configured to receive heat energy from the first battery cell and to transition the two-phase refrigerant into a gaseous refrigerant within the internal flow path utilizing the heat energy.

12. The battery cell assembly of claim 1, wherein the substantially rectangular-shaped plate is constructed of aluminum.

13. The battery cell assembly of claim 1, wherein the plate portion of the substantially rectangular-shaped plate is sized to cover substantially all of a substantially rectangular-shaped side surface of the first battery cell.

14. The battery cell assembly of claim 1, further comprising first and second rectangular ring-shaped frame members, the cooling fin and the first battery cell being disposed between the first and second rectangular ring-shaped frame members; wherein the first housing of the first battery cell has an unexpanded size such that the first housing is disposed a predetermined distance away from the first and second recessed regions and the first housing is not contacting the first and second recessed regions.

15. The battery cell assembly of claim 1, wherein the first, second, and third recessed regions do not contact one another.

16. A battery cell assembly, comprising:
a first battery cell having a first housing and first and second electrical terminals extending from the first housing; and
a cooling fin disposed against and contacting the first housing of the first battery cell, the cooling fin having a substantially rectangular-shaped metal plate that extends along a longitudinal axis, the substantially rectangular-shaped metal plate having a plate portion with a first side and a second side, the first side having first, second, and third recessed regions and first, second, third and fourth flat regions, the first recessed region being disposed between and contacting the first and second flat regions along the longitudinal axis, the second recessed region being disposed between and contacting the second and third flat regions along the longitudinal axis, the third recessed region being disposed between and contacting the third and fourth flat regions along the longitudinal axis; the first, second, and third recessed regions being disposed away and apart from each other; a depth of the each of the first, second, and third recessed regions is less than one-half of a thickness of the plate portion; and
the first housing of the first battery cell being disposed against the first side of the plate portion of the substantially rectangular-shaped metal plate such that the first housing contacts the first, second, third, and fourth flat regions.

17. The battery cell assembly of claim 16, wherein each of the first, second, and third recessed regions extend substantially perpendicular to the longitudinal axis and extend across at least two-thirds of a width of the plate portion.

18. The battery cell assembly of claim 16, further comprising first and second rectangular ring-shaped frame members, the cooling fin and the first battery cell being disposed between the first and second rectangular ring-shaped frame members; wherein the first housing of the first battery cell has an unexpanded size such that the first housing is disposed a predetermined distance away from the first and second recessed regions and the first housing is not contacting the first and second recessed regions.

* * * * *